United States Patent
Amano et al.

(10) Patent No.: US 7,418,777 B2
(45) Date of Patent: Sep. 2, 2008

(54) METHOD ON MANUFACTURING SPIN VALVE FILM (75) Inventors: Hajime Amano, Chuo-Ku (JP); Hiroaki Takezutsumi, Chuo-ku (JP); Tetsuro Sasaki, Chuo-ku (JP); Jun-ichi Sato, Chuo-ku (JP)

(73) Assignee: TDK Corporation, Tokyo (JP)

( * ) Notice: Subject to any disclaimer, the term of this patent is extended or adjusted under 35 U.S.C. 154(b) by 140 days.

(21) Appl. No.: 11/121,929

(22) Filed: May 5, 2005

(65) Prior Publication Data
US 2005/0231857 A1    Oct. 20, 2005

Related U.S. Application Data (62) Division of application No. 09/818,565, filed on Mar. 28, 2001, now Pat. No. 6,907,654.

(30) Foreign Application Priority Data
Mar. 29, 2000    (JP)    ............... 2000-92546

(51) Int. Cl.
G11B 5/127    (2006.01)
H04R 31/00    (2006.01)
(52) U.S. Cl. ............. 29/603.14; 29/603.09; 29/603.13; 204/192.15; 360/324.11; 360/324.12; 427/127; 427/128

(58) Field of Classification Search .............. 29/603.07, 29/603.09, 603.13, 603.14; 360/324.1, 324.11, 360/324.12; 204/192.15; 427/127–131
See application file for complete search history.

(56) References Cited

U.S. PATENT DOCUMENTS 5,784,225 A    7/1998    Saito et al.

(Continued)

FOREIGN PATENT DOCUMENTS

JP    A 11-284248    10/1999

(Continued)

OTHER PUBLICATIONS

Yamada et al., "AMR Effect in Spin-Valve Structure", IEEE transactions on Magnetics, vol. 32, Sep. 1996, pp. 3431-3433.

(Continued)

*Primary Examiner*—Paul D Kim
(74) *Attorney, Agent, or Firm*—Oliff & Berridge, PLC (57) ABSTRACT

A method of manufacturing a spin valve film, produces a large read out signal. After a completion of a film making process for forming a previous film of two films to be formed successively, but before an initiation of a film making process for forming a succeeding film of the two films, a step of decreasing an anisotropic magnetic field of the spin valve film is introduced by interrupting a film making process. This step may be performed by keeping a substrate within a sputtering vacuum chamber. The interruption can be shortened by exposing the substrate to a plasma, transferring the substrate in a separate vacuum chamber is lower or whose $H_2O$ or $O_2$ concentration is higher than that in the sputtering vacuum chamber, conducting a surface treatment with a gas containing $H_2O$ or $O_2$, or flowing a process gas.

13 Claims, 4 Drawing Sheets

U.S. PATENT DOCUMENTS

| | | | |
|---|---|---|---|
| 6,051,304 A | 4/2000 | Takahashi | |
| 6,210,818 B1 * | 4/2001 | Saito | 360/324.11 |
| 6,295,186 B1 | 9/2001 | Hasegawa et al. | |
| 6,387,548 B1 * | 5/2002 | Hasegawa et al. | 428/811.2 |
| 6,482,329 B1 | 11/2002 | Takahashi et al. | |
| 6,493,196 B1 | 12/2002 | Noma et al. | |
| 6,700,756 B1 | 3/2004 | Hasegawa | |

FOREIGN PATENT DOCUMENTS

| | | |
|---|---|---|
| JP | 2000150235 A | 5/2000 |
| WO | WO 97/05664 | 2/1997 |
| WO | WO 98/44521 | 8/1998 |
| WO | WO 00/65577 | 11/2000 |
| WO | WO 01/56090 | 8/2001 |

OTHER PUBLICATIONS

Tsang et al., "Design, Fabrication & Testing of Spin-Valve Read Heads for High Density Recording", IEEE Transactions on Magnetics, vol. 30, No. 6, Nov. 1994.

* cited by examiner

METHOD ON MANUFACTURING SPIN VALVE FILM

This is a Divisional of Application Ser. No. 09/818,565, filed Mar. 28, 2001 now U.S. Pat. No. 6,907,654. The entire disclosure of the prior application is hereby incorporated by reference herein in its entirety.

BACKGROUND OF THE INVENTION

1. Field of the Invention

The present invention relates to a method of manufacturing a spin valve film including an undercoat film, a first ferromagnetic film, a second ferromagnetic film and an electrically conductive film arranged between the first and second ferromagnetic films, and also relates to a method of manufacturing a thin film magnetic head comprising such a spin valve film.

2. Description of the Related Art

In accordance with miniaturization of magnetic disk drives, a thin film magnetic head including a magnetoresistive sensor utilizing the magnetoresistive effect has been widely used as a magnetic converting element which is suitable for reading information out of a magnetic record disk having information recorded thereon with a high surface recording density owing to a reason that an output of such a magnetoresistive sensor is not affected by a relative speed between the head and the disk.

In general, as a reading magnetoresistive element, an element utilizing an anisotropic magnetoresistive effect film (hereinafter referred to AMR film) such as a permalloy film has been used so far, but recently there has been further developed a reproducing element utilizing a giant magnetoresistive effect film (referred to GMR film). Particularly, a spin valve film has been mainly utilized as GMR film. Magnetoresistive sensors using spin valve films have been described in Japanese Patent Laid-open Publication Kokai Hei 4-358310 and "IEEE TRANSACTIONS ON MAGNETICS", Vol. 30, No. 6, November 1994. A typical spin valve film includes an undercoat film, a first ferromagnetic film, an electrically conductive film, and a second ferromagnetic film.

The electrically conductive film is sandwiched between the first and second ferromagnetic films. One of the first and second ferromagnetic films serves as a free layer which responds to an external magnetic field, and the other ferromagnetic film acts as a pinned layer having a fixed magnetic orientation.

When the first ferromagnetic film is used as the free layer, the second ferromagnetic film operates as the pinned layer, and when the first ferromagnetic film is used as the pinned layer, the second ferromagnetic film serves as the free layer. A ferromagnetic film utilized as the free layer may be formed by a NiFe film or a stack of Co film and CoFe film. A ferromagnetic film used as the pinned layer may be formed by a Co film or a CoFe film. An antiferromagnetic film is arranged adjacent to a ferromagnetic film serving as the pinned layer, and this ferromagnetic film is magnetized in one direction (being pinned) due to the exchange coupling between the antiferromagnetic film and the ferromagnetic film.

The undercoat film may be made of a suitable material which satisfies a higher magnetoresistive change rate (hereinafter referred to MR change rate), a small diffusion into a ferromagnetic film, and a higher resistance against etching.

When an external magnetic field is applied to the spin valve film, the magnetic orientation of the free layer is rotated in accordance with a magnitude of the external magnetic field. A resistance of the spin valve film is determined by an angle of a direction of magnetic orientation of the free layer with respect to a magnetic orientation of the pinned layer. A resistance of the spin valve film becomes maximum when a magnetic orientation of the free layer becomes opposite to that of the pinned layer and becomes minimum when the free layer and pinned layer have a same magnetic orientation. The external magnetic field can be sensed from a change in resistance.

The above mentioned spin valve film is manufactured by sputtering. Upon manufacturing the spin valve film, a substrate is introduced into a sputtering vacuum chamber, and successive films of the spin valve film are continuously formed by changing targets within the sputtering vacuum chamber, while sputtering is not interrupted for a meaningful or significant time period. When targets are changed, the film formation is temporarily interrupted, but its duration is too short to change a property of sputtered films.

In this known continuous film making method, a spin valve film having a high anisotropic magnetic field Hk as well as a high quality can be manufactured. The anisotropic magnetic field produced in the free layer is influenced by a magnetic field generated in the pinned layer. In the present specification, the anisotropic magnetic field Hk of the spin valve film means the anisotropic field which is magnetically influenced by the pinned layer.

The above mentioned spin valve film may be applied to magnetic sensor and nondestructive magnetic memory, and a most important application is a reading element of a thin film magnetic head. In order to increase an output read out signal from a thin film magnetic head having a spin valve film acting as a reading element, various means have been proposed and practiced.

However, output read out signals from spin valve films are limited as long as the spin valve films are manufactured by the continuous film forming process.

SUMMARY OF THE INVENTION

It is an object of the present invention to provide a method of manufacturing a spin valve film, in which a high output signal can be produced from a reading element of a thin film magnetic head.

According to the invention, a method of manufacturing a spin valve film comprises the steps of:
  forming an undercoat film on a substrate;
  forming, on said undercoat film, a first ferromagnetic film serving as a free layer;
  forming an electrically conductive film on said first ferromagnetic film;
  forming, on said electrically conductive film, a second ferromagnetic film serving as a pinned layer; and
  forming an antiferromagnetic film on said second ferromagnetic film; whereby during a process for forming said undercoat film, first ferromagnetic film, electrically conductive film and second ferromagnetic film constituting the spin valve film, after a completion of a film making process for forming a previous film of two films to be formed successively, but before an initiation of a film making process for forming a succeeding film, a step of decreasing an anisotropic magnetic field of the spin valve film by interrupting a film making process is introduced.

According to the invention, a method of manufacturing a spin valve film comprises the steps of:
  forming an undercoat film on a substrate;
  forming, on said undercoat film, a first ferromagnetic film serving as a pinned layer;
  forming an electrically conductive film on said first ferromagnetic film;

forming, on said electrically conductive film, a second ferromagnetic film serving as a free layer; and forming an antiferromagnetic film on said second ferromagnetic film; whereby during a process for forming said undercoat film, first ferromagnetic film, electrically conductive film and second ferromagnetic film constituting the spin valve film, after a completion of a film making process for forming a previous film of two films to be formed successively, but before an initiation of a film making process for forming a succeeding film, a step of decreasing an anisotropic magnetic field of the spin valve film by interrupting a film making process is introduced.

In the method according to the invention, a process of forming the thin films constituting the spin valve film is interrupted between the steps of forming successive films and there is additionally introduced the step of decreasing an anisotropic magnetic field Hk of the spin valve film lower than an anisotropic magnetic field Hk obtained by the known film forming method by absorbing elements in an interface between the successive films. When the anisotropic magnetic field Hk of the spin valve film is decreased, it is possible to obtain a large read out signal when such a spin valve film is used as a reading element of a thin film magnetic head.

In the method of manufacturing a spin valve film according to the invention, the above mentioned various films constituting the spin valve film may be formed within a vacuum chamber by various methods such as sputtering, MBE and vapor deposition. In this case, the step of decreasing an anisotropic magnetic field of the spin valve film by interrupting a film making process after a completion of a film making process for forming a previous film of two films to be formed successively, but before an initiation of a film making process for forming a succeeding film of the two films may be carried out in various ways.

For instance, the film forming process is interrupted and the step of decreasing the anisotropic magnetic field may be carried out, while the substrate is remained in a thin film forming vacuum chamber after a completion of the previous film forming step. Alternatively, after a completion of the previous film forming step, the substrate is transferred into a separate vacuum chamber and the step of decreasing the anisotropic magnetic field is performed within this separate vacuum chamber. In the latter case, after the interruption of the film forming process, the substrate may be returned into the film forming vacuum chamber and then the succeeding film forming step may be started.

The step of interrupting the film forming process may be carried out by keeping the substrate within the film forming vacuum chamber for a given time period. In this case, a time period during which the substrate is kept in the vacuum chamber may be not shorter than three minutes and may be clearly distinguished from the conventional continuous methods. A typical time period of interrupting the film forming process in the method according to the present invention may be, for instance 20 minutes.

According to the invention, a time period during which said step of decreasing the anisotropic magnetic field by interrupting the film forming process is performed may be shortened. For instance, after the step of forming the previous film is finished, but before the step of forming the succeeding film is initiated, the substrate may be exposed to a plasma at least once, said plasma not contributing to the film formation. In this method, a time period of interrupting the film forming process can be extremely shortened and the anisotropic magnetic field can be decreased to a required level. This step may be carried out while the substrate is remained in a film forming vacuum chamber or in a separate vacuum chamber.

A time period during which the film forming process is interrupted can be shortened by the following methods.

(a) During the formation of the spin valve film, after a completion of the previous film forming step, but prior to an initiation of the succeeding film forming step, the substrate is transferred from a film forming vacuum chamber into a separate vacuum chamber which is kept at a lower degree of vacuum than that of the film forming vacuum chamber.

(b) During the formation of the spin valve film, after a completion of the previous film forming step, but prior to an initiation of the succeeding film forming step, the substrate is transferred from a film forming vacuum chamber into a separate vacuum chamber having a higher $H_2O$ or $O_2$ concentration than that of the film forming vacuum chamber.

(c) During the formation of the spin valve film, after a completion of the previous film forming step, but prior to an initiation of the succeeding film forming step, the substrate surface is processed with the aid of a gas containing $H_2O$ or $O_2$ by not less than 1 ppm.

(d) During the formation of the spin valve film, after a completion of the previous film forming step, but prior to an initiation of the successive film forming step, the substrate is remained within a film forming vacuum chamber and a process gas is flown therethrough.

The present invention also relates to a method of manufacturing a thin film magnetic head including a reading element formed by a spin valve film. The thin film magnetic head has the reading element including the spin valve film and a writing element of inductive type. It should be noted that the writing element may be a lateral recording element or perpendicular recording element.

According to the invention, a method of manufacturing a thin film magnetic head includes a step of forming a magnetoresistive type reading element having a spin valve film before or after forming an inductive type writing element such that the writing element is supported by a substrate, and said step comprises the steps of:

forming an undercoat film on said substrate;

forming, on said undercoat film, a first ferromagnetic film serving as a free layer;

forming an electrically conductive film on said first ferromagnetic film;

forming, on said electrically conductive film, a second ferromagnetic film serving as a pinned layer; and forming an antiferromagnetic film on said second ferromagnetic film; whereby during a process for forming said undercoat film, first ferromagnetic film, electrically conductive film and second ferromagnetic film constituting the spin valve film, after a completion of a film making process for forming a previous film of two films to be formed successively, but before an initiation of a film making process for forming a succeeding film of said two films, a step of decreasing an anisotropic magnetic field of the spin valve film by interrupting a film making process is introduced.

According to the invention, a method of manufacturing a thin film magnetic head includes a step of forming a magnetoresistive type reading element having a spin valve film before or after forming an inductive type writing element such that the writing element is supported by a substrate, and said step comprises the steps of:

forming an undercoat film on said substrate;

forming, on said undercoat film, an antiferromagnetic film;

forming, on said antiferromagnetic film, a first ferromagnetic film serving as a pinned layer;

forming an electrically conductive film on said first ferromagnetic film; and forming, on said electrically conductive film, a second ferromagnetic film serving as a free layer;

whereby during a process for forming said first ferromagnetic film, electrically conductive film and second ferromagnetic film constituting the spin valve film, after a completion of a film making process for forming a previous film of two films to be formed successively, but before an initiation of a film making process for forming a succeeding film of said two films, a step of decreasing an anisotropic magnetic field of the spin valve film by interrupting a film making process is introduced.

DESCRIPTION OF THE PREFERRED EMBODIMENTS

Figure 1:
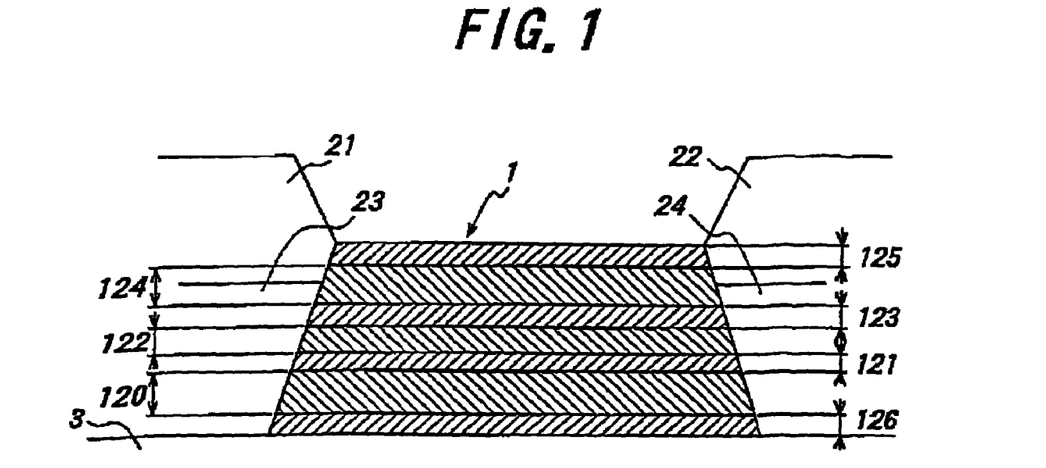
FIG. 1 is a schematic view showing an example of the spin valve film.

FIG. 1 is a cross sectional view showing the structure of the spin valve film to be manufactured by the method according to the invention. The spin valve film 1 is formed by a stack of an undercoat film 126, a first ferromagnetic film 120, 121, an electrically conductive film 122, a second ferromagnetic film 123, an antiferromagnetic film 124 and a protection film 125. The undercoat film 126 is formed on a non-magnetic substrate 3 and constitutes a lowermost film.

The first ferromagnetic film 120, 121 is formed on the undercoat film 126. In the present embodiment, the first ferromagnetic film 120, 121 serves as a free layer which responds to an external magnetic field and is formed as a double layer film including a stack of a ferromagnetic film 120 and a ferromagnetic film 121. It should be noted that the first ferromagnetic film 120, 121 may be formed by a single ferromagnetic film or a stack of more than two ferromagnetic films. In the example shown in FIG. 1, the ferromagnetic film 120 is termed as a first free layer and the ferromagnetic film 121 is called a second free layer. Furthermore, a stack of the first and second free layers 120 and 121 is sometimes called a free layer 120, 121. The first free layer 120 may be made of, for instance NiFe, and the second free layer 121 may be made of, for instance Co and CoFe.

The electrically conductive film 122 is formed on the second free layer 121, and may be made of, for instance Cu.

The second ferromagnetic film 123 is formed on the electrically conductive film 122. The second ferromagnetic film 123 may be made of, for instance Co or CoFe.

The antiferromagnetic film 124 is formed on the second ferromagnetic film 123. These second ferromagnetic film 123 and antiferromagnetic film 124 perform the exchange coupling and the second ferromagnetic film 123 is magnetized in one direction. The orientation of this magnetization is fixed. In the example shown in FIG. 1, the second ferromagnetic film 123 is called a pinned layer. The pinned layer 123 may be made of various conventional materials which have been proposed hereinbefore.

The antiferromagnetic film 124 may be made of various materials which have been proposed hereinbefore. The antiferromagnetic film 124 may be made of materials which mainly consisting of, for instance PtMn, NiMn, RuRh, Mn or IrMn. The antiferromagnetic film 124 may be also made of materials which includes at least one element selected from the group consisting of Ru, Rh, Pd, Au, Ag, Fe and Cr. When the antiferromagnetic film 124 is made of PtMn, the pinned layer 123 may be advantageously made of CoFe. The protection film 125 is provided on the antiferromagnetic film 124.

On both sides of the spin valve film 1, there are arranged magnetic domain control films 23 and 24 which serve to apply a longitudinal magnetic bias to the free layer 120, 121. The magnetic domain control films 23, 24 may be formed by a magnet or an antiferromagnetic film which produces the exchange coupling between the antiferromagnetic film and the free layer 120, 121. Electrical lead conductor films 21 and 22 are provided on the magnetic domain control films 23 and 24, respectively. The electrical lead conductor films 21 and 22 are provided for conducting an electrical current to the conductive film 122 of the spin valve film 1.

Under a condition that the pinned layer 123 is magnetized in one direction due to the exchange coupling with respect to the antiferromagnetic film 124, when an external magnetic field is applied, the orientation of the magnetization of the free layer 120, 121 is rotated by an angle in accordance with a strength of the external magnetic field. A resistance value of the spin valve film 1 is determined by an angle of the magnetization of the free layer 120, 121 with respect to the orientation of the magnetization of the pinned layer 123. Then, the external magnetic field can be detected by a change in the sense current in accordance with a resistance change.

Figure 2:
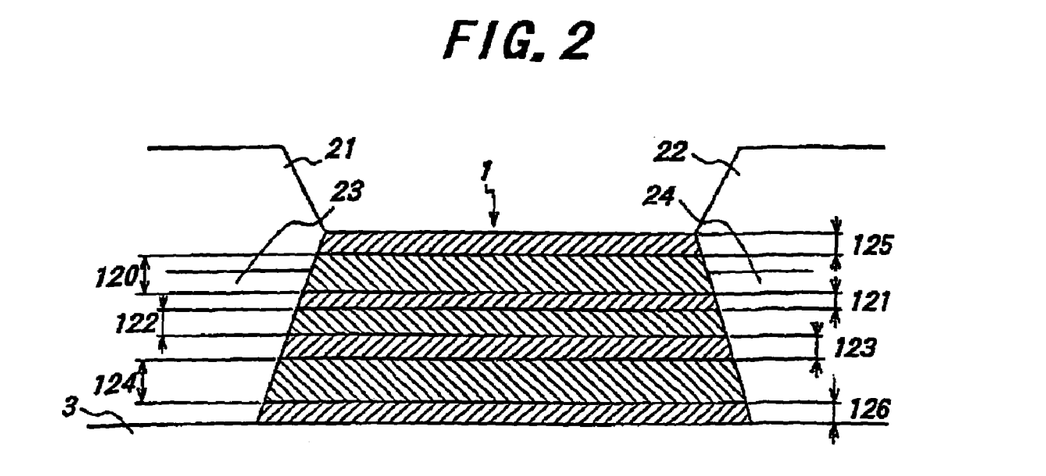
FIG. 2 is a schematic view illustrating another example of the spin valve film.

FIG. 2 is a cross sectional view showing schematically another example of the spin valve film to be manufactured by the method according to the invention. In FIG. 2, portions similar to those of the structure illustrated in FIG. 1 are denoted by the same reference numerals used in FIG. 1. The spin valve film depicted in FIG. 2 has characteristics that the antiferromagnetic film 124 is provided on the undercoat film 126, the pinned layer 123 is formed on the antiferromagnetic film 1214, the electrically conductive film 122 is formed on the pinned layer 123, and the free layer 121, 120 is formed on the electrically conductive film 122.

According to the invention, during the manufacturing process of the spin valve film 1 shown in FIG. 1, i.e. during a process of forming the undercoat film 126, the first ferromagnetic film 120, 121 constituting the free layer, the electrically conductive film 122 and the second ferromagnetic film constituting the pinned layer, after a completion of a film making process for forming a previous film of two films to be formed successively, but before an initiation of a film making process for forming a succeeding film of said two films, a step of decreasing an anisotropic magnetic field of the spin valve film by interrupting a film making process is introduced. According to further aspect of the invention, during the manufacturing process of the spin valve film 1 illustrated in FIG. 2, i.e. during a process of forming the antiferromagnetic film 124, the first ferromagnetic film 120, 121 constituting the pinned layer, the electrically conductive film 122 and the second ferromagnetic film constituting the free layer, after a completion of a film making process for forming a previous film of two films to be formed successively, but before an initiation of a film making process for forming a succeeding film of said two films, a step of decreasing an anisotropic magnetic field of the spin valve film by interrupting a film making process is introduced.

In case of manufacturing the spin valve film shown in FIG. 1, a timing for interrupting the film making process to reduce the anisotropic magnetic field of the spin valve film may be selected at will from the following options:

(a) after forming the undercoat film 126, but before forming the first free layer 120
(b) after forming the first free layer, but before making the second free layer 121
(c) after forming the second free layer 121, but before manufacturing the electrically conductive film 122
(d) after forming the electrically conductive film 122, but before making the pinned layer 123

One of the above mentioned options (a)-(d) may be carried out, or as a case may be plural options may be conducted.

The following options may be conceived for a case of manufacturing the spin valve film illustrated in FIG. 2.

(e) after making the pinned layer 123, but before forming the electrically conductive film 122
(f) after forming the electrically conductive film 122, but before making the second free layer 121
(g) after making the second free layer 121, but before forming the first free layer 121

Also one or a plurality of the above mentioned options (e)-(g) may be performed during the manufacturing process of the spin valve film show in FIG. 2.

In the manufacturing method according to the invention, the anisotropic magnetic field Hk is reduced lower than the anisotropic magnetic field Hk obtained by the known continuous film making process. The inventors have found that when the anisotropic magnetic field Hk is reduced, a larger read out signal can be derived from the reading element of the thin film magnetic head which is formed by the spin valve film manufactured by the method according to the present invention.

Figure 3:
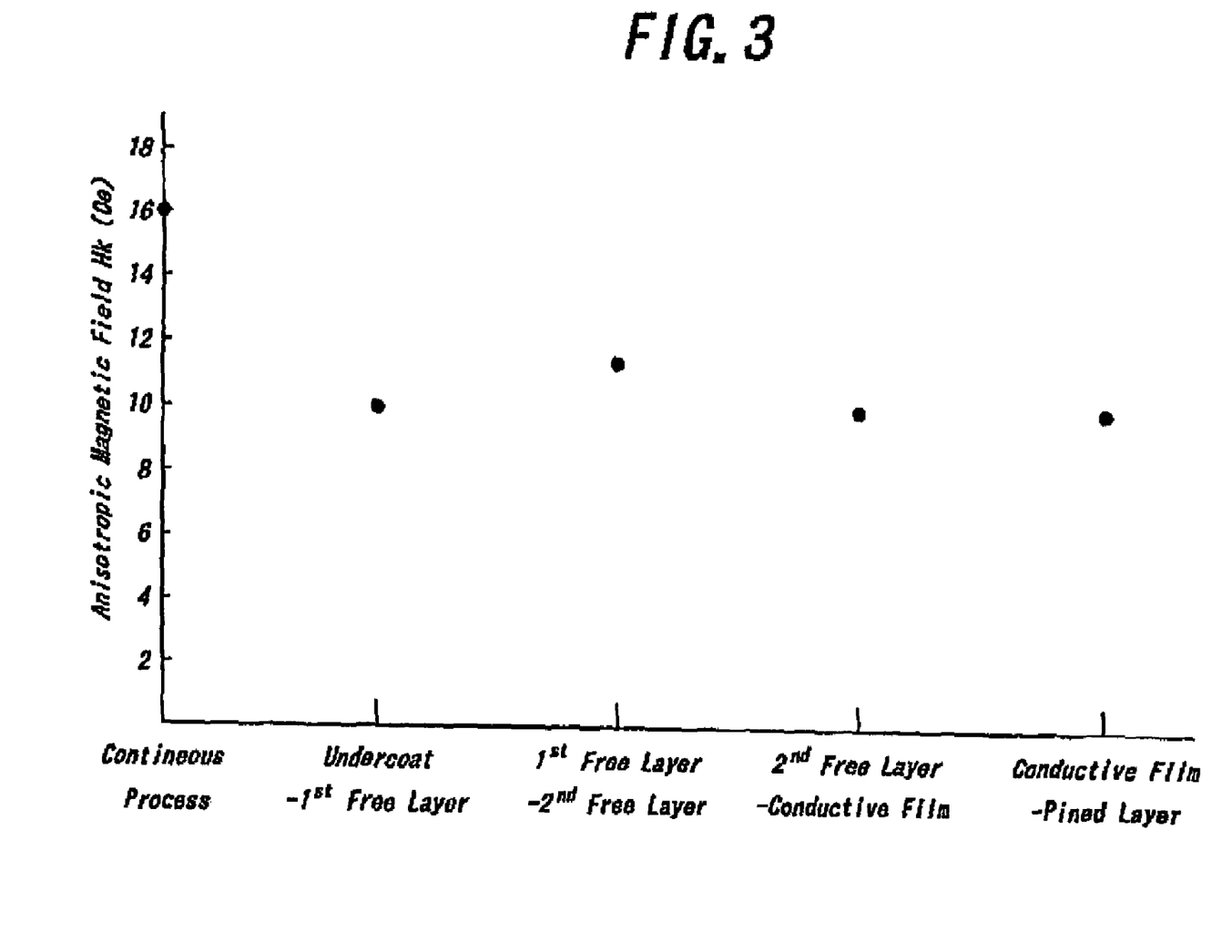
FIG. 3 is a graph representing a relationship between a timing of the interruption of the film forming process and the anisotropic magnetic field.

FIG. 3 represents a relationship between the anisotropic magnetic field Hk and the interruption timings of the film making process. In FIG. 3, "Continuous Process" shows the anisotropic magnetic field obtained by the known continuous film making process.

"Undercoat-$1^{st}$ Free Layer" represents a case, in which after forming the undercoat film 126, but prior to the formation of the first free layer 120, the spin valve film is manufactured by interrupting the film making process to perform the anisotropic magnetic field reducing step.

"$1^{st}$ Free Layer-$2^{nd}$ Free Layer" denotes a process, in which after forming the first free layer 120, but before making the second free layer 121, the spin valve film is manufactured by carrying out the anisotropic magnetic field reducing step by interrupting the film making process.

"$2^{nd}$ Free Layer-Conductive Film" shows a process, in which after making the second free layer 121, but before forming the electrically conductive film 122, the spin valve film is manufactured by conducting the anisotropic magnetic field reducing step by interrupting the film making process.

"Conductive Film-Pinned Layer" represents a process, in which after making the electrically conductive film 122, but before forming the pinned layer 123, the spin valve film is manufactured by conducting the anisotropic magnetic field reducing step by interrupting the film making process.

In all the embodiments, the step of reducing the anisotropic magnetic field by interrupting the film making process is carried out by keeping the substrate (wafer) within the sputtering vacuum chamber for twenty minutes. A degree of vacuum of the vacuum chamber is kept to a value which is required for making films ($1.0 \times 10^{-6}$ Pa). In these embodiments, the substrate is held in the sputtering vacuum chamber, but according to the invention, the substrate may be removed into another vacuum chamber. In this case, during a transportation of the substrate, the substrate has not to be exposed to the atmosphere.

A vertical axis of FIG. 3 denotes the anisotropic magnetic field Hk (Oe) of the spin valve filmed formed by the various processes.

As depicted in FIG. 3, the spin valve film formed by the known continuous film making process has the anisotropic magnetic field Hk of about 16 (Oe). The spin valve films formed by interrupting the film making process according to the present invention have the anisotropic magnetic field Hk of about 10-12 (Oe).

Figure 4:
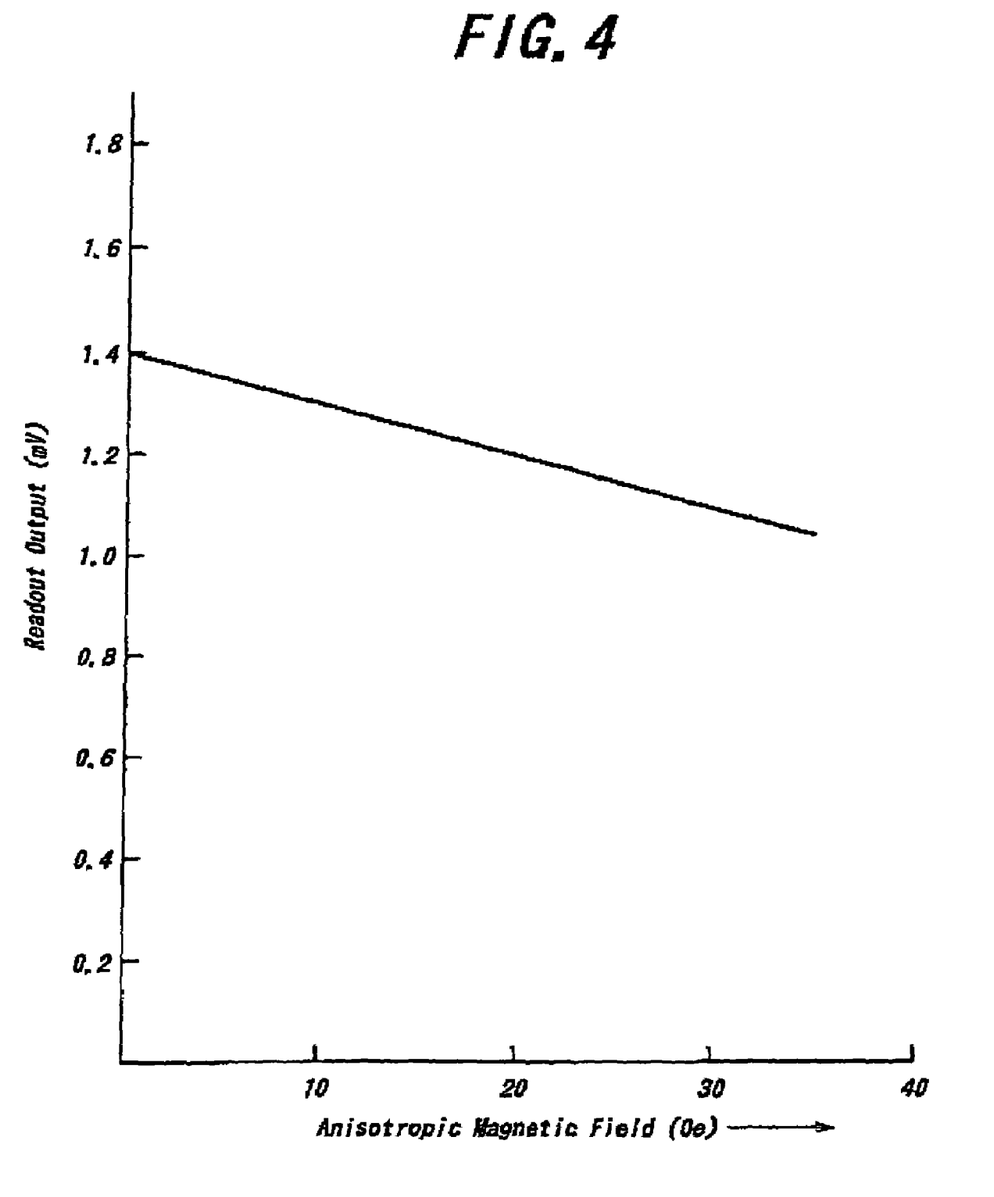
FIG. 4 is a graph showing a relationship between the anisotropic magnetic field Hk (Oe) and a read out output signal (mV) from a reading element having the spin valve film.

FIG. 4 represents a relationship between the anisotropic magnetic field Hk (Oe) and the read out signal (mV) from the thin film magnetic heads including the reading elements formed by the spin valve films. As shown in FIG. 4, the read out signal becomes larger in accordance with a decrease in the anisotropic magnetic field Hk.

In the spin valve film formed by the known continuous film making process, the anisotropic magnetic field Hk is about 16 (Oe) as can be read from FIG. 3, and then the read out signal becomes about 1.2 (mV).

In the spin valve films formed by the method according to the present invention including the interruption of film making process to reduce the anisotropic magnetic field, the anisotropic magnetic field Hk of about 10-12 (Oe) is obtained from the data shown in FIG. 3. In this case, the read out signal becomes about 1.3 (mV). In this manner, the larger read out signal can be obtained as compared with the known process.

In another embodiment of the method according to the invention, after forming a previous film and before making a succeeding film, the substrate may be exposed, at least once, to a plasma which does not accompany the film formation. In this method, an anisotropic magnetic field of the spin valve film can be reduced to a required level within a very short processing time. The substrate may be exposed to the plasma within the sputtering vacuum chamber or in a separate vacuum chamber.

The processing time may be shortened by another methods. For instance, the substrate may be moved into a separate vacuum chamber whose degree of vacuum is lower than that of the sputtering vacuum chamber after making a previous film and before forming a succeeding film. In this case, the substrate has to not be exposed to the atmosphere.

Figure 5:
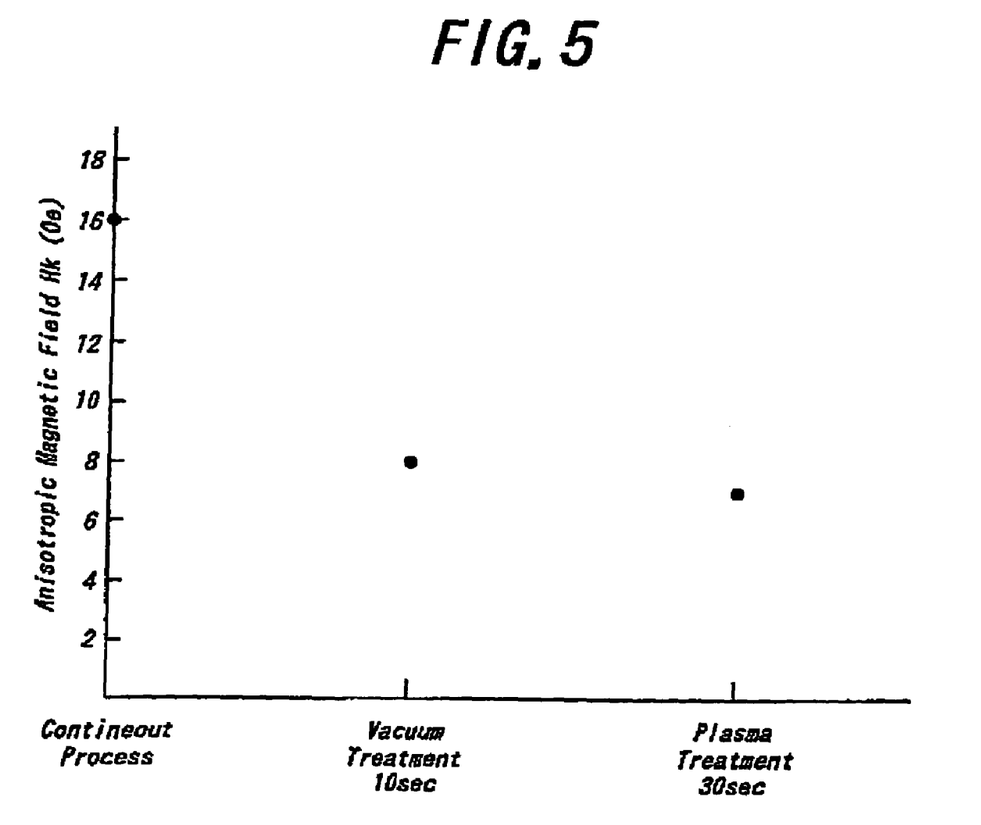
FIG. 5 is a graph denoting a relationship between the anisotropic magnetic field and various processes.

FIG. 5 shows a relationship between the processes and the anisotropic magnetic field Hk. "Continuous Process" on a horizontal axis of FIG. 5 shows the process in which the spin valve film is formed by the known continuous film making process.

"Vacuum Treatment" denotes the process, in which the substrate is transferred into a separate vacuum chamber having a degree of vacuum lower than that of the sputtering vacuum chamber after forming a previous film but before making a succeeding film. In practice, after forming undercoat film 126 within the sputtering vacuum chamber having a degree of vacuum higher than $10^{-6}$ Pa, but before forming the first free layer 120, the substrate removed from the sputtering vacuum chamber into a separate vacuum chamber whose degree of vacuum is lower than that of the sputtering vacuum chamber, e.g. $10^{-5}$-$10^{-6}$ Pa for ten seconds. After that, the substrate is returned into the sputtering vacuum chamber and the first free layer 120 is formed. The process time during which the substrate is set in the vacuum chamber is not limited to ten seconds, and may be longer or shorter than ten seconds.

"Plasma Treatment" represents a process, in which the substrate is exposed once to plasma which does not accompany the film formation after forming a previous film and before making a succeeding film. In practice, after forming the undercoat film 126 within the sputtering vacuum chamber and before forming the first free layer 120, a target shutter provided in the sputtering vacuum chamber is closed and the substrate is exposed to plasma for thirty seconds. After that, the shutter is opened again and the first free layer 120 is formed. The process time is not limited to thirty seconds, and may be longer or shorter than thirty seconds.

As can be understood from FIG. 5, the anisotropic magnetic field Hk of the spin valve film manufactured by the known continuous method is about 16 (Oe), but the anisotropic magnetic field Hk of the spin valve films formed by the above mentioned vacuum treatment and plasma treatment is reduced to about 8 (Oe).

From FIG. 4, the known spin valve film having the anisotropic magnetic field Hk of about 8 (Oe) produces the read out signal of about 1.2 (mV), but the spin valve films formed by the vacuum treatment and plasma treatment and having the anisotropic magnetic field Hk of about 8 (Oe) have the read out signal of about 1.35 (mV).

Moreover, in the vacuum treatment, the reduced anisotropic magnetic field can be reduced by the ten-seconds process, and the in the plasma treatment, the reduced anisotropic magnetic field can be attained by the thirty-seconds process. In this manner, the process time can be shortened materially.

In another effective method for shortening the process time, after forming a previous film and before making a succeeding film, the substrate is transferred into a separate vacuum chamber having a higher concentration of $H_2O$ or $O_2$ gas than the sputtering vacuum chamber. In practice, after forming the undercoat film 126 within the sputtering vacuum chamber, but before making the first free layer 120, the substrate is set into a separate vacuum chamber having a higher concentration of $H_2O$ or $O_2$ gas than the sputtering vacuum chamber for ten to thirty seconds. After that, the substrate is returned into the sputtering vacuum chamber and the first free layer 120 is formed.

Another effective method for shortening the process time is a surface treatment with gas. That is to say, after forming a previous film and before making a succeeding film, the surface of the substrate is treated with a gas containing $H_2O$ or $O_2$ with a concentration not less than 1 ppm. In practice, after making the undercoat film 126 within the sputtering vacuum chamber, but before forming the first free layer 120, the substrate is set into a separate vacuum chamber and the surface treatment is conducted with a gas containing $H_2O$ or $O_2$ gas by a concentration not less than 1 ppm. The surface treatment may be carried out for ten to thirty seconds. After that, the substrate is set again into the sputtering vacuum chamber and the first free layer 120 is formed. The surface treatment may be performed within the sputtering vacuum chamber without transporting the substrate into another vacuum chamber.

In another effective method for shortening the process time is a treatment with a process gas. That is to say, after forming a previous film and before making a succeeding film, the substrate is subjected to a process gas flow. In practice, after making the undercoat film 126 within the sputtering vacuum chamber, but before forming the first free layer 120, the substrate is removed from the sputtering vacuum chamber into a separate vacuum chamber and is kept therein for a given time period while a process gas is flown through the separate vacuum chamber. A process time may be about ten to thirty seconds. After that, the substrate is returned into the sputtering vacuum chamber and the first free layer 120 is formed. The process gas treatment may be performed within the sputtering vacuum chamber without transporting the substrate into another vacuum chamber. The process gas may be a conventional process gas generally used in the sputtering and is essentially consisting of a rare gas such as Ar, Ne and Xe and contains $H_2O$, $O_2$ and $N_2$.

In any methods for shortening the process time, the above mentioned options (a)-(g) may be equally adopted. One or a plurality of options (a)-(g) may be performed. Moreover, two or more options may be carried out in combination.

As explained above, when the spin valve film manufactured by the method according to the present invention is used as the reading element of the thin film magnetic head, a large read out signal can be derived from the reading element.

The invention claimed is:

1. A method of manufacturing a spin valve film comprising the steps of:
   forming an undercoat film on a substrate;
   forming, on the undercoat film, a first ferromagnetic film serving as a free layer;
   forming an electrically conductive film on the first ferromagnetic film;
   forming, on the electrically conductive film, a second ferromagnetic film serving as a pinned layer; and
   forming an antiferromagnetic film on the second ferromagnetic film,
   wherein the spin valve film includes the undercoat film, the first ferromagnetic film, the electrically conductive film, and the second ferromagnetic film; and
   wherein during a film making process for forming the spin valve film, and after a completion of a first forming process for forming a first film of two films which are selected from the undercoat film, the first ferromagnetic film, the electrically conductive film, and the second ferromagnetic film and which are to be formed successively, but before an initiation of a second forming process for forming a second film of the two films, a step of decreasing an anisotropic magnetic field of the spin valve film is initiated by interrupting the film making process is introduced.

2. The method of manufacturing a spin valve film according to claim 1, wherein the films constituting the spin valve film are formed by sputtering, molecular beam epitaxy or vapor deposition while the substrate is set in a film forming vacuum chamber.

3. The method of manufacturing a spin valve film according to claim 2, wherein after finishing the first forming process, the step of decreasing an anisotropic magnetic field of the spin valve film by interrupting a film making process is carried out while the substrate is kept in the film forming vacuum chamber.

4. The method of manufacturing a spin valve film according to claim 3, wherein after finishing the first film forming process, the step of decreasing an anisotropic magnetic field is performed by exposing the substrate to plasma which does not accompany a film formation.

5. The method of manufacturing a spin valve film according to claim 3, wherein after finishing the first film forming process, the step of decreasing an anisotropic magnetic field is conducted by flowing a process gas.

6. The method of manufacturing a spin valve film according to claim 3, wherein after finishing the first film forming process, the step of decreasing an anisotropic magnetic field is conducted by a surface treatment with a gas containing $H_2O$ or $O_2$ by a concentration not less than 1 ppm.

7. The method of manufacturing a spin valve film according to claim 2, wherein after finishing the first film forming process within the film forming vacuum chamber, the substrate is transferred into a separate vacuum chamber and the step of decreasing an anisotropic magnetic field by interrupting the film making process is performed, and then the substrate is returned into the film forming vacuum chamber and the second film forming process is performed.

8. The method of manufacturing a spin valve film according to claim 7, wherein after finishing the first film forming process, the substrate is transferred into the separate vacuum chamber and the step of reducing an anisotropic magnetic field is carried out by exposing the substrate to a plasma which does not accompany film formation.

9. The method of manufacturing a spin valve film according to claim 7, wherein after finishing the first film forming process, the substrate is transferred into the separate vacuum chamber, and the step of decreasing an anisotropic magnetic field is conducted by flowing a process gas.

10. The method of manufacturing a spin valve film according to claim 7, wherein after finishing the first film forming process, the step of decreasing an anisotropic magnetic field is performed by transferring the substrate into the separate vacuum chamber whose degree of vacuum is lower than that of the film forming vacuum chamber.

11. The method of manufacturing a spin valve film according to claim 7, wherein after finishing the first film forming process, the step of decreasing an anisotropic magnetic field is conducted by transferring the substrate into the separate vacuum chamber having higher $H_2O$ or $O_2$ concentration than the film forming vacuum chamber.

12. The method of manufacturing a spin valve film according to claim 7, wherein after finishing the first film forming step, the substrate is transferred into the vacuum chamber, and the step decreasing an anisotropic magnetic field is carried out by subjecting the substrate to a surface treatment with a gas contaning $H_2O$ or $O_2$ with a concentration not less than 1 rpm.

13. A method of manufacturing a thin film magnetic head including a step of forming a magnetoresistive type reading element having a spin valve film before or after forming an inductive type writing element such that the writing element is supported by a substrate, and the step of forming the magnetoresistive type reading element having the spin valve layer comprising:

forming an undercoat film on the substrate;

forming, on the undercoat film, a first ferromagnetic film serving as a free layer;

forming an electrically conductive film on the ferromagnetic film;

forming, on the conductive film, a second ferromagnetic film serving as a pinned layer; and forming an antiferromagnetic film on the ferromagnetic film, wherein the spin valve film includes the undercoat film, the first ferromagnetic film, the electrically conductive film, and the second ferromagnetic film; and wherein during a film making process for forming the spin valve film, and after a completion of a first forming process for forming a first film of two films which are selected from the undercoat film, the first ferromagnetic film, the electrically conductive film, and the second ferromagnetic film and which are to be formed successively, but before an initiation of a second forming process for forming a second film of the two films, a step of decreasing an anisotropic magnetic field of the spin valve film is initiated by interrupting a the film making process is introduced.

* * * * *